United States Patent [19]
Cast et al.

[11] 3,774,755
[45] Nov. 27, 1973

[54] HOLDING BAND FOR FASTENERS

[75] Inventors: Adolf Cast, Oberlenningen; Jörg M. Reich, Nurtingen, both of Germany

[73] Assignee: Karl M. Reich Maschinenfabrik, Nurtingen, Germany

[22] Filed: Apr. 28, 1971

[21] Appl. No.: 138,178

[30] Foreign Application Priority Data
May 6, 1970 Germany............. P 20 22 136.7

[52] U.S. Cl.................. 206/56 DF, 206/46 H
[51] Int. Cl............................. B65d 83/00
[58] Field of Search.............. 85/17; 206/56 A, 206/56 AC, 56 DF, 3, 46 H; 227/136

[56] References Cited
UNITED STATES PATENTS

| | | | |
|---|---|---|---|
| 2,433,914 | 1/1948 | Lang | 206/56 DF UX |
| 2,127,665 | 8/1938 | Leslie | 206/56 DF X |
| 1,614,831 | 1/1927 | Crofoot | 206/56 DF UX |
| 3,438,487 | 4/1969 | Gallee et al. | 206/56 DF |

FOREIGN PATENTS OR APPLICATIONS

| 820,002 | 9/1959 | Great Britain | 206/56 DF |
|---|---|---|---|

Primary Examiner—George E. Lowrance
Assistant Examiner—Steven E. Lipman
Attorney—Arthur O. Klein

[57] ABSTRACT

A holding band for fasteners such as nails, screws or the like which is provided with a row of resilient tongues projecting in pairs from the two lateral sides of the back of the band and then converging toward each other so that their free ends or points near their ends substantially engage with each other. These free ends are provided with recesses of a width substantially in accordance with the diameter of the shank of a fastener so that, when a nail or screw is inserted between a pair of the tongues, the walls of these recesses will embrace and grip the shank. The back of the band is provided with a row of holes through each of which a drive rod or screw driver may be passed to act upon the head of a nail or screw. These holes have a size slightly smaller than the diameter of the heads of the nails or screws to prevent the latter from sliding therethrough.

16 Claims, 16 Drawing Figures

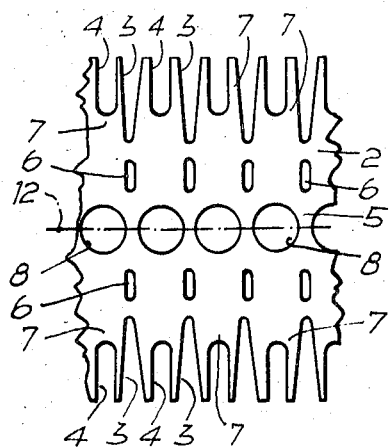
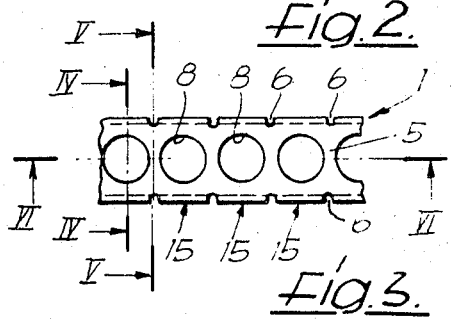
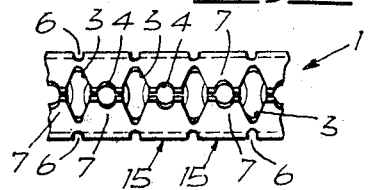
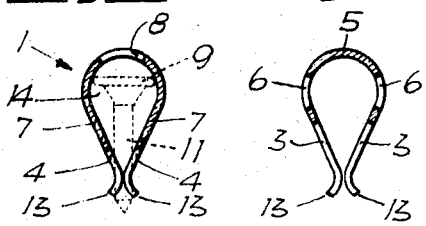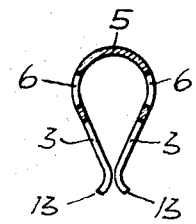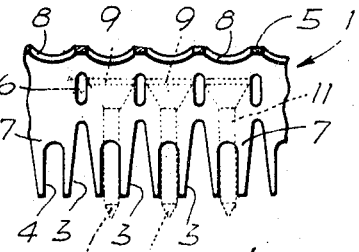
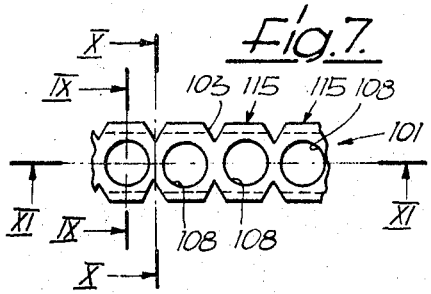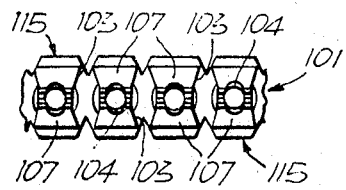
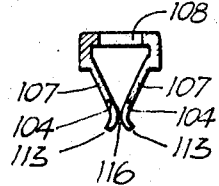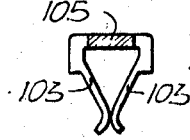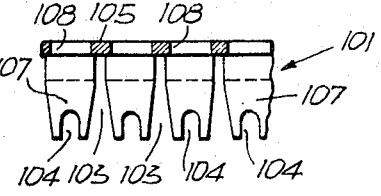

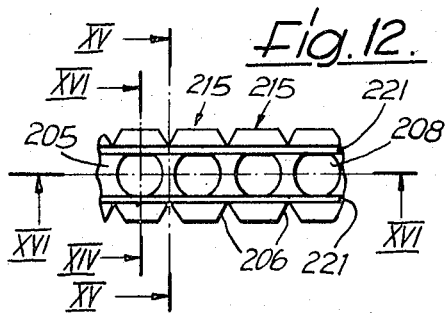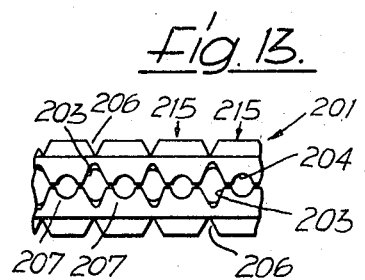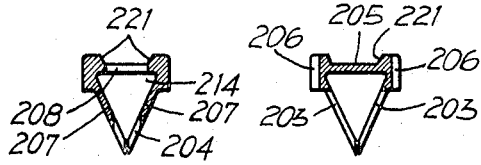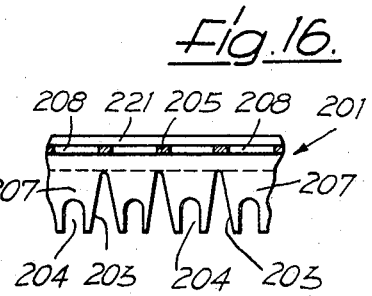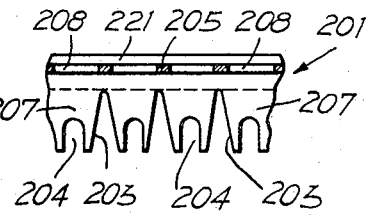

HOLDING BAND FOR FASTENERS

The present invention relates to a band for holding a row of fasteners which comprises a common supporting strip and a separate holding member for each fastener which consists of pairs of resilient tongues which project from one side of the two lateral edges of the supporting strip and each of which is provided with a recess in its free end for receiving and holding the shank of a fastener.

The principal objects of the present invention are to provide a holding band of a construction as stated above, to design such holding bands for holding fasteners of various kinds and of different dimensions, for example, screws, nails, pins or the like, at suitable distances from each other in a straight row to make such holding bands of the smallest possible thickness which still permits them to hold the fasteners securely, and also to design these holding bands so as to permit the fasteners, for example, screws or nails, to be easily driven out of it into a workpiece by suitable driving means without danger of damaging any parts of the holding band.

The principal features of the invention for attaining these objects consist in designing the holding band so that each holding member of this band including its pair of tongues partly encloses a space for receiving one end, for example, the headed end, of a fastener, in designing each pair of these tongues so as to converge toward each other from a common supporting strip, and in providing this supporting strip with apertures through each of which a tool may be inserted for acting upon at least a part of the end surface of a fastener which is held by the tongues of the respective holding member. Each holding member of the holding band is therefore adapted to receive one fastener so that the head of the fastener will engage into the space provided for it within the holding member and will be embraced by the latter in such a manner that the two tongues of the holding member resiliently engage upon opposite sides of the shank of the fastener. Although the inner end of a fastener, for example, its head, is then covered by the supporting strip, a driving tool of a machine or device for driving the fasteners into a workpiece, for example, the free end of the drive rod of a pneumatically operated machine or the screw driver of a motor-driven screw-driving machine, may act upon this inner end or head of the fastener by passing through the central aperture of each section of the supporting strip forming the back part of a holding member. Since the two tongues of each holding member converge at an acute angle toward the shank of a fastener, the latter when acted upon by a drive rod or screw driver may easily slide between and out of these tongues even if the shank is provided with a screw thread.

The holding band according to the present invention may be produced of any suitable resilient material, for example, a plastic, spring steel or the like. Since it hardly ever occurs that the holding band might be damaged by driving the fasteners therefrom, it may be refilled with new fasteners when empty and may thus be used repeatedly. The holding band may be modified in accordance with the fasteners to be held which may consist, for example, of nails with different kinds of heads or without heads, of normally slotted or cross-slotted screws or screws with a hexagonal recess either with or without heads, or of pins or the like. However, the holding band according to the invention is especially of advantage for holding headed fasteners such as nails or screws since the converging tongues of each holding member will grip the shank of the fastener underneath its head and the fastener will thus be prevented from sliding unintentionally in its axial direction within its holding member due to the fact that one side of the fastener head engages upon the back of the holding member which forms a part of the common supporting strip, while the edges of the other side of the fastener head engage upon the roots of the tongues.

In order to make the tongues as resilient as possible and the entire holding band as flexible as possible, the tongues may taper toward their free ends. Since the tongues should, however, be able to grip the shank of a fastener as securely as possible, a preferred embodiment of the invention provides that the two tongues of each holding member first converge toward each other to a point which is spaced at a short distance from their free ends and engage at that point with each other, and that subsequent to this point these ends are bent outwardly so as to diverge from each other. This has the result that the shank of a fastener will be firmly clamped between the two tongues and that the two arms of each tongue which are formed by a slot-shaped recess in the free end portion of the tongue will extend for a considerable distance along and at both sides of the fastener shank.

A strip of fasteners which is formed by the holding band according to the invention may be employed in suitable fastener driving machines or devices. The feeding means of such a fastener driving machine or device may then engage between the tongues of the holding band and feed the same forwardly by a step-by-step movement. According to a preferred embodiment of the invention, the common supporting strip of the holding members is provided between the adjacent holding members with at least one notch and these notches are disposed within at least one line which extends parallel to the longitudinal axis of the supporting strip. These notches considerably increase the flexibility of the holding band and especially of the supporting strip thereof, and since they are disposed within a line extending parallel to the longitudinal axis of the band, they may also be used for the engagement of suitable feeding means.

It is a further object of the present invention to provide suitable methods of manufacturing such holding bands.

One of these methods which has the advantage of being very simple and inexpensive consists in producing the holding band of a flat strip with parallel edges, in punching slot-shaped recesses out of the edge portions of the strip so as to form tongues and also punching the other required recesses and apertures out of the other parts of the strip, and in then bending the two lateral sides of the strip in one direction about its central longitudinal axis so that these sides are equally curved about an axis extending parallel to the strip axis between the two sides and the ends of the corresponding tongues on the two sides substantially engage with each other. The strip may consist, for example, of a thermoplastic which after the recesses and apertures are punched out may in a slightly softened condition be bent around the head ends of a row of fasteners in such a manner that the tongues of each holding member will engage upon a fastener. The same step in the production of a holding band according to the invention may thus also serve for producing a strip of interconnected fasteners.

However, since the tongues are resilient, the associated tongues may also be spread apart after the holding band is completed and the row of fasteners may then be inserted between the respective pairs of tongues either from one end of the band or by passing them between the free opened ends of the tongues in the axial direction of the latter so that, when the tongues are then released, they will grip the fasteners.

A second method of producing the holding bands according to the invention consists in extruding a tube of the required cross section which has a longitudinal slot along its entire length, in then punching recesses out of the edge portions adjacent to the longitudinal slot so as to form the tongues and the recesses in their ends, and also punching the apertures out of the tube directly opposite to the longitudinal slot, that is, out of the supporting strip or the backs of the holding members. Although this second method also permits an efficient production of the holding bands, it only permits materials to be used which may be extruded, for example, thermoplastics, while the first method as previously described also permits the holding bands to be made of a spring steel strip.

The features and advantages of the present invention will become further apparent from the following detailed description thereof which is to be read with reference to the accompanying drawings, in which FIG. 1 shows a top view of a section of a flat strip into which apertures and recesses have been punched for producing a holding band according to one embodiment of the invention;

FIG. 2 shows a top view of the holding band after it has been bent to its desired shape from the flat strip as shown in FIG. 1;

FIG. 3 shows a bottom view of the holding band according to FIG. 2;

FIGS. 4, 5 and 6 show cross sections which are taken in FIG. 2 along the lines IV — IV, V — V, and VI — VI, respectively;

FIGS. 7 and 8 show views similar to FIGS. 2 and 3 of a holding band according to a second embodiment of the invention;

FIGS. 9, 10, and 11 show cross sections which are taken in FIG. 7 along the lines IX — IX, X — X, and XI — XI, respectively;

FIGS. 12 and 13 show views similar to FIGS. 2 and 3 of a holding band according to a third embodiment of the invention; while FIGS. 14, 15 and 16 show cross sections which are taken in FIG. 12 along the lines XIV — XIV, XV — XV, and XVI — XVI, respectively.

Referring to the drawings, the holding band 1 as shown in FIGS. 2 to 6 is produced of a flat strip 2 as shown in FIG. 1 which may consist of polyethylene, polypropylene or a similar plastic or of spring steel. The lateral edge portions of this strip 2 which originally has a uniform width are punched out successively so as to form equal deeper slot-shaped recesses 3 which extend substantially transversely of the strip up to a central strip part 5, and shorter recesses 4 between and alternating with the deeper recesses 3. The opposite edges of each deeper recess 3 diverge from their inner ends, that is, from the central strip part 5, toward the respective outer edge of strip 2, while the opposite edges of each shorter recess 4 extend substantially parallel to each other. The deeper recesses 3 divide the opposite edge portions of strip 2 into rows of equal tongues 7 which are tapered toward their outer ends and each of which is centrally divided for a part of its length by a shorter recess 4 extending inwardly from the outer edges of strip 2. The axes of tongues 7 and of recesses 3 and 4 on one side of strip 2 are in straight alignment with those of the other side and extend at right angles to the longitudinal axis 12 of the strip. Centrally of the strip and thus also centrally between the corresponding tongues 7 on the opposite sides thereof, the strip part 5 is provided with circular apertures 8 each of which has a diameter slightly smaller than that of the head 9 of a screw 11, as indicated in FIG. 4, the shank of which is to be gripped by a pair of opposite tongues 7.

Strip 2 is further provided with elongated openings 6 each of which is disposed within the common axis of two opposite longer recesses 3 and at equal distances from the longitudinal axis 12 of the strip and extends transversely to this axis 12. Depending upon the length of the desired holding bands 1, all of the recesses, openings, and apertures 3, 4, 6 and 8 may be punched out either in one operation from a strip 2 or the associated recesses and apertures within and at both sides of the longitudinal axis 12 may be punched out successively or in successive groups from one end of strip 2 to the other. The two sides of strip 2 are then equally bent about the longitudinal axis 12 toward each other to the shape as shown in FIGS. 4 and 5, in which the opposite tongues 7 substantially engage with each other at points which are spaced at a short distance from their free ends 13 which diverge from these points away from each other. Strip 2 is thereby bent so as to have such a radius of curvature that the widest part of the space 14 which is defined by the curved part of strip 2 has a size in accordance with the diameter of the heads 9 of the screws 11 which are to be gripped by the holding band 1 which is produced from strip 2.

When the strip 2 is bent to the shape as shown in FIGS. 4 and 5, the longer or deeper recesses 3 which separate each pair of tongues 7 from the adjacent pairs divide the holding band 1 into sections or holding members 15 each of which is adapted to hold one screw 11. These adjacent holding members 15 are also partly separated from each other by the elongated openings 6 and the back of each holding member 15 is provided with a central round aperture 8 which, after a screw 11 has been inserted into the respective holding member 15, is located directly above the head 9 of this screw. In this particular embodiment of the invention it is assumed that the screws 11 have cross-slotted coutersunk heads so that a suitable screw driver with a corresponding cross blade may be inserted through the aperture 8 into the cross slot of the screw head 9.

As illustrated in FIG. 4, the particular shape of the free ends of each pair of tongues 7 and the length and width of the recesses 4 therein insure that the opposite edges of each of these recesses 4 engage upon a relatively long part of the shank of screw 11 and thus hold the latter securely.

For attaining the desired shape of the holding band 1, strip 2 may be bent around a template and in a manner so as to remain in the bent position. It may, however, also be bent directly around a row of screws 11 which are spaced at the required distance from each other, so that simultaneously with the formation of the holding band 1 a fixed strip of screws 11 is formed.

It is, however, also possible to insert the screws 11 into the completely shaped holding band 1 either from one end of the latter or from below after bending the tongues 7 of each pair and the edges of the strip part 5 slightly away from each other which may be done by a suitable device. After the screws 11 have been inserted into the holding band 1, the tongues 7 will engage resiliently upon the shanks of the screws so that these screws are clamped securely by the holding band 1.

FIGS. 7 to 11 illustrate a holding band 101 according to a second embodiment of the invention in which the different parts of this band which are functionally similar to those of the holding band according to FIGS. 2 to 6 are designed by reference numerals which are increased by 100 over the numerals as previously applied. The functions of these parts therefore do not have to be described again in detail.

This holding band 101 is made from an extruded tube which is provided with a longitudinal slot along its entire length and has a cross-sectional shape which substantially forms an isosceles triangle. The supporting part of the holding band 101 is formed by the base or back wall 105 of the triangular tube which together with the adjacent edge portions of the side walls of the tube has a thickness greater than the lower main parts of these side walls which are separated from each other by a narrow slot 116 i.e. the above-mentioned longitudinal slot. These side walls are provided with slot-shaped openings (recesses) 103 and are thereby divided into separate tongues 107 which are tapered toward their free ends in which central recesses 104 are provided. Therefore, also in this embodiment of the invention the opposite openings (recesses) 103 between each pair of tongues 107 divide the holding band 101 into sections or holding members 115 each of which is adapted to hold one screw. At the center of the base or back part 105 of each holding member 115 a circular aperture 115 is provided the diameter of which is slightly smaller than the diameter of the head 9 of each screw which is to be held by this holding band in a similar manner as indicated in FIG. 4. These apertures 108 through which the end of a screw driver may be inserted therefore do not permit the screw heads to project therethrough so that the screws can also not be accidentally pushed out of the holding band in the upward direction thereof.

FIGS. 12 to 16 illustrate a holding band 201 according to a third embodiment of the invention which like that as shown in FIGS. 7 to 11 is also made from an extruded tube of a substantially triangular cross section. Those parts of this holding band which are functionally similar to those as shown in FIGS. 7 to 11 are designated by reference numerals which are increased by 100 over the numerals as applied in FIGS. 7 to 11 and by 200 over those applied in FIGS. 1 to 6, and it is therefore again not necessary to repeat the description of the functions of these parts in detail.

The supporting part 205 of this holding band 201 is formed not only by the base or back wall of the triangular tube, but also by the adjacent upper edge portions of the side walls of the tube which are also made of a greater thickness than the main lower parts of these side walls in the same manner as in the second embodiment of the invention as shown in FIGS. 7 to 11, in which, however, the recesses 103 extend up to the base or back wall of the tube so that these thicker parts of the side walls are likewise interrupted and can therefore not be regarded as parts of the supporting part 105. In the present case, the recesses 203 in the side walls of the triangular tube only extend through the thinner lower parts of these walls and only divide these parts into tongues 207, while the thicker upper parts of the side walls from which the tongues project form parts of the supporting part 205. These thicker upper parts are provided with openings (notches) 206 the centers of which are disposed within the same planes in which the center lines of the recesses 203 are located. These openings (notches) 206 form two rows which extend parallel to the longitudinal axis of the holding band 201 like the two rows of apertures 6 in the band 1 as shown in FIGS. 1 to 6. Also like these apertures 6, the openings (notches) 206 together with the recesses 203 divide the holding band into sections or holding members 215.

The outer surface of the supporting part 205 is provided with a groove which extends along the entire length of the holding band and the side walls 221 of which converge toward the bottom of the groove. At the center of each holding member 215 of the holding band 201, this bottom of the groove is provided with a nearly circular aperture 208 which extends up to the inclined side walls 221. The free ends of the tongues 207 are also in this case provided with central recesses 204 the walls of which are adapted to embrace the shank of a screw or nail. The free ends of each pair of tongues 207 are, however, not bent away from each other like the ends 13 and 113 of the tongues of the holding bands according to FIGS. 1 to 6 and FIGS. 7 to 11, respectively, but they extend in straight directions toward each other.

As may especially be seen in FIG. 12, the circular parts of the apertures 208 are made of a size equal to the diameter of the heads of the fasteners such as screws, nails or the like, but at two diametrically opposite sides these apertures are slightly restricted by the inclined side walls 221 of the longitudinal groove in the supporting part 205. This permits the fasteners to be inserted from above into the holding band 201. The heads of the fasteners may then be pressed downwardly against the inclined side walls 221 which will thereby be bent resiliently for a small distance away from each other and permit the fastener heads to pass through the apertures 208 into the inside 214 of the holding bands. The lower edges of these side walls 221 will then prevent the fastener heads from sliding back through the apertures 208 even if a pressure is exerted upon the lower ends of the fasteners. In this manner it is possible, for example, by an automatic apparatus, to fill the holding band 201 with fasteners by simply passing them from above through the apertures 208.

Although our invention has been illustrated and described with reference to the preferred embodiments thereof and especially with reference to holding bands for screws or nails, we wish to have it understood that it is in no way limited to the details of such embodiments but that it is capable of numerous modifications within the scope of the appended claims. Thus, for example, it is possible to design these holding bands also for connecting other kinds of fasteners such as pins, bolts or the like to each other so as to form strips of such fasteners which may be manufactured in large series and may also be refilled repeatedly. The holding bands according to the invention may also be designed, for example, for holding nails with overlapping heads in a row behind each other.

Having thus fully disclosed our invention, what we claim is:

1. A holding band adapted to hold a row of fasteners having shanks, comprising a supporting strip, a row of separate tongues integral with and projecting from each lateral side of said supporting strip so as to form pairs of associated tongues, at least a part of the length of said tongues being resilient, said tongues of each pair equally converging toward each other, the free end of each tongue of each pair having a recess through which the shank of one of said fasteners, when such a fastener is disposed in the space between said pair of tongues, extends to the outside beyond said free ends, the walls of said recesses being adapted to embrace the opposite sides of the part of said shank extending through said recesses, said supporting strip having a central row of apertures equally spaced from each other and each having an axis extending through the center of said space between each pair of said tongues, each of said apertures being adapted to receive a tool for acting upon at least a part of the end surface of a fastener, if such a fastener is provided between said pair of tongues.

2. A holding band as defined in claim 1, in which said tongues taper toward their free ends.

3. A holding band as defined in claim 1, in which said tongues of each pair converge toward each other so as substantially to engage with each other at points spaced at a short distance from their free ends, said free ends diverging from said points away from each other.

4. A holding band as defined in claim 1, and adapted to hold headed fasteners, in which each of said apertures has a size slightly smaller than the diameter of the head of one of said fasteners so as to prevent said head from sliding out of said space through said aperture.

5. A holding band as defined in claim 4, in which each of said apertures has a size and shape permitting a headed fastener to be inserted therethrough into said space when a pressure is exerted upon said head in one axial direction of said fastener and said aperture is thereby resiliently enlarged, said aperture preventing said head from sliding out of said space in the opposite axial direction.

6. A holding band as defined in claim 1, in which said supporting strip is provided in each side from its longitudinal axis with openings having a center disposed within a transverse plane of said strip extending centrally between two adjacent tongues, the centers of all of said openings in each side of said strip being disposed within a line extending parallel to the longitudinal axis of said strip.

7. A holding band as defined in claim 6, in which said openings have closed peripheries.

8. A holding band as defined in claim 1, in which said band including said tongues is produced from a flat strip having two lateral sides with parallel edges and slot-shaped recesses in said sides extending inwardly from said edges and substantially transversely to the longitudinal axis of said strip and dividing said sides into said separate tongues, each of said tongues of one side and a corresponding tongue of the other side forming a pair, said tongues of each of said pairs being bent toward each other so as to converge toward one side of said band.

9. A holding band as defined in claim 8, in which said strip is bent about its longitudinal axis so that said sides are equally curved about an axis extending parallel to said longitudinal axis between said sides.

10. A holding band as defined in claim 6, in which said openings in said sides are elongated and extend transversely to the longitudinal axis of said strip.

11. A holding band as defined in claim 1, in which said band is produced of a tube having a slot extending through its wall from one end to the other and being parallel to the axis of said tube, said tube being provided with longer recesses extending substantially transversely to said axis from the two edges of said slot and at equal distances from each other as seen in the longitudinal direction of said tube, the material of said tube between said recesses forming said tongues, said tube being further provided with a shorter recess extending transversely from each of the two edges of said slot into the free end of each of said tongues.

12. A holding band as defined in claim 11, in which said tube has a cross-sectional shape substantially like an isosceles triangle, one side of said triangle forming said supporting strip, and the two other sides of said triangle being divided by said slot at their ends opposite to said first side and provided with said longer recesses to form said tongues and with said shorter recesses in the free ends of said tongues.

13. A holding band as defined in claim 12, in which at the lateral edges of said supporting strip and the marginal portions of said two other sides adjacent to and integral with the lateral edges of said supporting strip have a greater thickness than the other parts of said two sides.

14. A holding band as defined in claim 13, in which said longer recesses defining the lateral sides of said tongues also extend through said thicker marginal portions substantially up to said supporting strip.

15. A holding band as defined in claim 13, in which said longer recesses defining the lateral sides of said tongues only extend through said other parts of said two other sides up to said thicker marginal portions.

16. A holding band as defined in claim 13, in which the outer side of said supporting strip is provided with a longitudinal groove having side walls extending substantially parallel to the axis of said strip and converging toward the bottom of said groove, said apertures in said supporting strip extending through said bottom, and said side walls being spaced from each other so as to limit the width of said apertures.

* * * * *